(12) United States Patent
Kruk

(10) Patent No.: US 11,233,754 B2
(45) Date of Patent: Jan. 25, 2022

(54) REAL-TIME CHAT MESSAGE PREVIEW ENABLING TO VIEW THE MESSAGE DURING THE WRITING PROCESS

(71) Applicant: Konrad Kruk, Wroclaw (PL)

(72) Inventor: Konrad Kruk, Wroclaw (PL)

(73) Assignee: LIVECHAT SOFTWARE S.A, Wroclaw (PL)

( * ) Notice: Subject to any disclaimer, the term of this patent is extended or adjusted under 35 U.S.C. 154(b) by 90 days.

(21) Appl. No.: 16/437,134

(22) Filed: Jun. 11, 2019

(65) Prior Publication Data
US 2020/0396183 A1    Dec. 17, 2020

(51) Int. Cl.
*G06F 15/16*    (2006.01)
*H04L 12/58*    (2006.01)

(52) U.S. Cl.
CPC ............ *H04L 51/04* (2013.01); *H04L 51/043* (2013.01); *H04L 51/046* (2013.01); *H04L 51/06* (2013.01); *H04L 51/063* (2013.01)

(58) Field of Classification Search
CPC ....... H04L 51/04; H04L 51/12; H04L 51/043; H04L 51/046; H04L 51/06; H04L 51/063
USPC .......................... 709/220, 224, 226, 228, 232
See application file for complete search history.

(56) References Cited

U.S. PATENT DOCUMENTS

| | | | | |
|---|---|---|---|---|
| 9,807,078 | B2 * | 10/2017 | Porzio | H04L 51/08 |
| 10,251,128 | B2 * | 4/2019 | Nguyen | H04W 4/14 |
| 10,623,451 | B2 * | 4/2020 | Rathod | H04L 65/4061 |
| 10,764,293 | B2 * | 9/2020 | Du | H04L 61/2007 |
| 10,937,425 | B2 * | 3/2021 | Summa | G06F 3/167 |
| 2010/0002400 | A1 * | 1/2010 | Lin | G06F 1/185 |
| | | | | 361/736 |
| 2010/0205541 | A1 * | 8/2010 | Rapaport | G06F 16/285 |
| | | | | 715/753 |
| 2012/0191774 | A1 * | 7/2012 | Bhaskaran | H04H 60/33 |
| | | | | 709/203 |
| 2013/0047099 | A1 * | 2/2013 | Markman | G06F 40/253 |
| | | | | 715/758 |
| 2014/0236953 | A1 * | 8/2014 | Rapaport | G06Q 10/10 |
| | | | | 707/740 |
| 2014/0330911 | A1 * | 11/2014 | Hunter | G06F 3/04817 |
| | | | | 709/206 |
| 2016/0255139 | A1 * | 9/2016 | Rathod | H04L 51/046 |
| | | | | 709/203 |
| 2017/0366395 | A1 * | 12/2017 | Goldfarb | H04L 12/4641 |

(Continued)

*Primary Examiner* — Khanh Q Dinh
(74) *Attorney, Agent, or Firm* — Jacob Eisenberg

(57) ABSTRACT

A system and method for communicating messages over a communication channel is disclosed wherein a user content that would ultimately make a user message is generated by a first user at a first application or widget and sent to a chat server for subsequent sending to a second user for viewing via the second user's application or widget. The refresh frequency of the user content between the first user and the server is at every up to 500 milliseconds while the send rate between the server and the second widget is at or after at least 500 milliseconds. Accordingly, the second user is able to preview the first user's message before the first user's message is ultimately written and manually sent to the second user by the first user. The second user is here able to preview the user content at up to 500 millisecond refresh rates, thereby giving the second user a real-time preview into what is being generated by the first user.

14 Claims, 4 Drawing Sheets

(56) References Cited

U.S. PATENT DOCUMENTS

| | | | | |
|---|---|---|---|---|
| 2018/0084011 | A1* | 3/2018 | Joseph | H04L 63/1425 |
| 2018/0213056 | A1* | 7/2018 | Chau | H04L 51/04 |
| 2019/0052701 | A1* | 2/2019 | Rathod | H04L 67/22 |
| 2019/0251281 | A1* | 8/2019 | Freedman | G06F 21/62 |
| 2020/0195604 | A1* | 6/2020 | Hassan | G06Q 10/107 |

* cited by examiner

REAL-TIME CHAT MESSAGE PREVIEW ENABLING TO VIEW THE MESSAGE DURING THE WRITING PROCESS

BACKGROUND OF THE INVENTION

The present disclosure relates to the need for timely customer service and the provision of technical support as may arise from chat exchanges made over the Internet such as via first and second widgets between for example a customer or first user and a chat agent or second user. Customer service and technical support is oftentimes sought via online means for convenience and/or technical necessity. Any improvements to communications, and exchange of data in particular, is desirable in the art in order to improve the user or customer experience along with the actual provision of the technical support and/or customer service.

BRIEF SUMMARY OF THE INVENTION

Embodiments of the present disclosure are directed to enabling the chat agent or second user, namely, a person or bot arranged to receive a customer service and/or technical support request, to view a message or first user generated content from the first user requesting the customer service and/or technical support before the message has been factually sent, in order to enable a better understanding of the first user's intentions by the second user. In this situation, by the first user, it is meant any person contacting the second user, which may, in turn, be business representatives, sales teams or webpage support, with the communicating being affected via chat implemented on the webpage.

Further to embodiments of the present disclosure, anyone who uses chat, especially on a daily basis, may be interested in a better understanding of the other user and the other user's particular needs as related to customer service and/or technical support. Accordingly, the embodiments shall support customer service efficiency and raise work effectiveness arising out of the possibility of previewing the message or user content of the first user during the first user's writing process.

Real-time data presentation shall serve as the core functionality of the embodiments of the present disclosure; the functionality presenting or depicting the content of not manually sent messages without further manual saving or editing of the messages, the messages comprising the user generated content as it is being generated. Consequently, the embodiments of the present disclosure's aim shall serve only within informative dimension towards the embodiment's users. The embodiments shall differ from purely informative solutions presenting only information that a writing is in progress, as may be found in current solutions implemented in numerous communication systems. The embodiments of the present disclosure shall give a value to the users by not only informing users that there is an upcoming and/or possibly incoming request as may be relayed by the message and/or user content in particular but also by presenting the content of the written message that makes up the request before the written message is actually sent.

Embodiments of the present disclosure may be implemented in any real-time conversation channel as live chat or any other communication channel. The embodiments allow for the previewing of unsent messages by the first user, namely, a potential visitor or customer of the webpage or application where the embodiment is implemented. The preview is displayed in the chat window of the agent or second user responsible for the contact with the customer or first user. The text written in the chat window by the first user shall be refreshed every 500 milliseconds (ms) regardless of the first user's writing flow, namely, the message shall be visible in the chat window of the agent or second user even if the first user is still writing the message, namely the first user generated user content. An example of the aforementioned is depicted in FIG. 4.

Embodiments of the present disclosure shall address the issue of the responsive customer assistance and/or technical support via web page or application where chat or other communication channel is implemented. By the preview of the (manually) unsent message, the second user or agent is able to prepare a timely response and observe the request preparation flow of what may provide a better customer or first user understanding.

Further advantages, features and details of the present disclosure result from the following description of preferred embodiments and drawings. The characteristics and combinations of features mentioned above in the description, as well as the characteristics and combinations of features listed below in the description of figures and/or shown in the figures alone, are not limited to the combination indicated in each case; but can also be used in other combinations or on their own without leaving the scope of the invention.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

In the following, an advantageous embodiment of the invention is explained with reference to the accompanying figures, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C"

should be understood as including only one of A, only one of B, only one of C, or any combination of A, B, and C.

The idea of the embodiments of the present disclosure is built upon the assumption that previewing of a not yet manually sent message may constitute value for business owners and may address a need for efficient customer service which becomes crucial as the element of a well-maintained business process. The embodiments of the present disclosure was created for communication channels such as chat solutions enabling real-time conversations.

Figure 1:
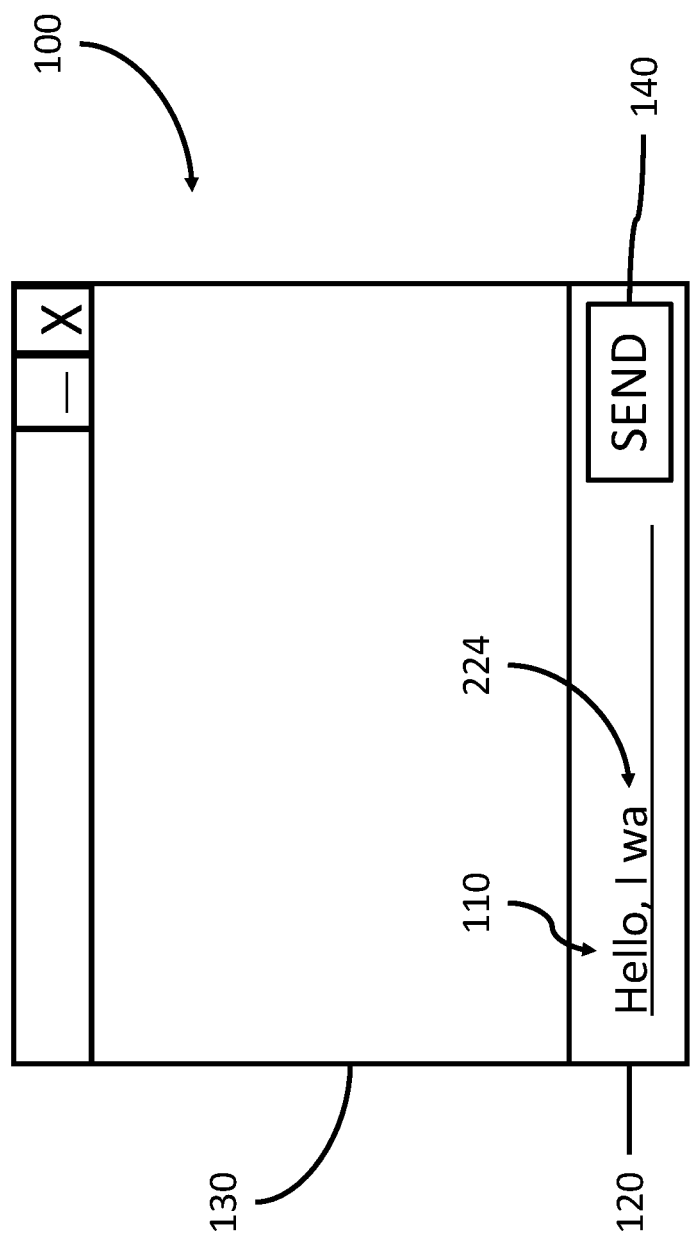
FIG. 1 depicts a chat application widget wherein the embodiment may be implemented.

As depicted in FIG. 1, embodiments of the present disclosure is implemented in the chat widget 100 and oriented around previewing to the second user or agent any first user generated content 110 being either written or copy-pasted and then possibly edited in the message content field 120. As depicted, the chat widget 100 includes a window 130 in which not only message content field 120 may be found but also a send button 140 arranged in or near the message content field 120 which, as known to the skilled person, comprises a means by which a user may manually activate the sending of the user generated content 110 by the click of a mouse pointer or the like on the send button 140. As further depicted, the content 110 comprises an example an incomplete text message 224 entered or currently being entered by the user, namely, "Hello, I wa". Such incomplete text message may be grammatically incorrect as evidenced by the incomplete third word "wa" as well as be an incomplete statement, as evidenced by the entirety of the "Hello, I wa". Further to embodiments of the present disclosure, this incomplete message is what will be seen or previewed by the agent.

Figure 2:
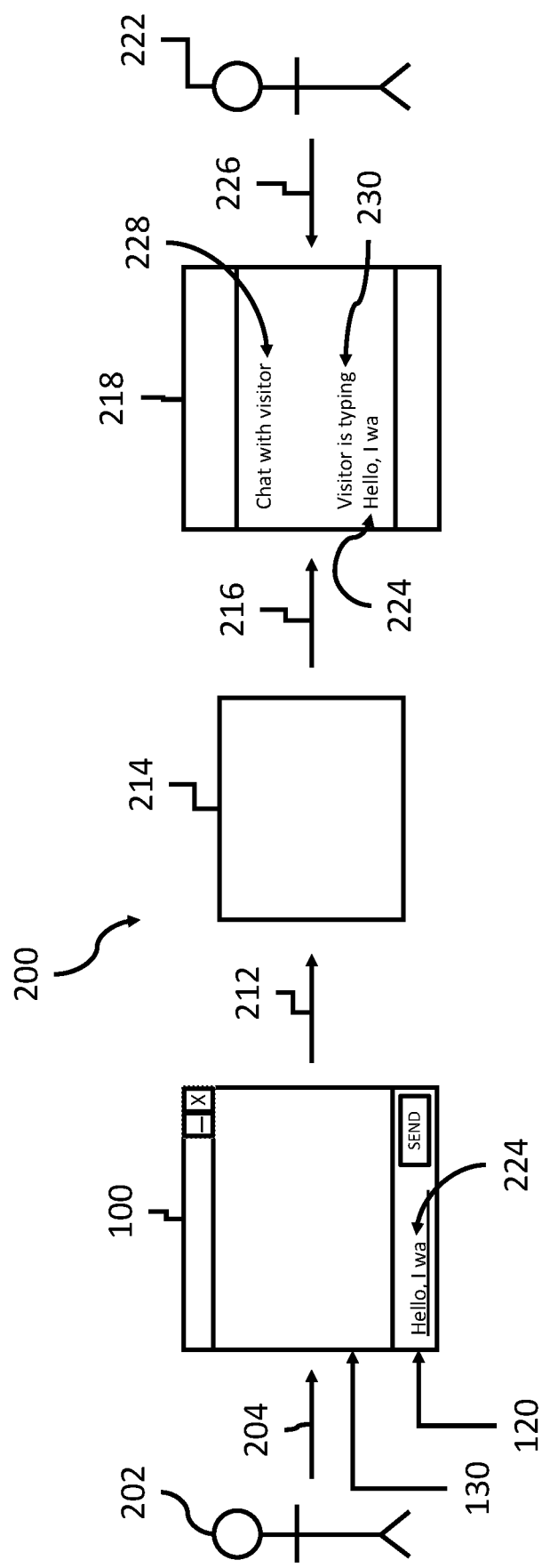
FIG. 2 depicts an embodiment flow depicting dependency upon text implemented via chat being displayed before manual sending thereof in the chat agent or second user window.

FIG. 2 presents the flow of communication between the embodiment and other elements cooperating and existing components of the chat widget where the embodiment may be implemented. According to FIG. 2, the flow starts with a first user 202 action, namely keystrokes (204) which shall be understood as a trigger in the process of embodiment functionality. As the typing occurs in the chat widget or first widget (100), the embodiment starts sending a network request 212 to a chat server 214 which is configured to allow for a display of information collected at the first user chat window 130. Such display is depicted in FIG. 2 as text 224 in a second widget 218 which is accordingly visible (226) to second user 222. An example display as depicted includes an information to the second user that what is being displayed is a "Chat with visitor" (228) and that the "Visitor is typing" (230) first user content comprising that which is depicted in first widget 100. Afterward, the embodiment sends a server response to the application of the second user or agent with a constantly updated version of the text or first user content 224 written at the level of the second user chat window 218. As presented by FIG. 2, the embodiment shall refresh the version being updated and send it to the chat agent or second user through the chat server 214 with a frequency of up to 500 milliseconds (ms). Of note in the workflow suggested by the embodiment and depicted in the figures is that data display and refresh is not conditional upon the end of typing, i.e., the completion of the intended message to be sent by the first user to the second user, and in fact, the embodiment shall send an updated version of the first user content each <500 milliseconds regardless of the state registered within texting tab or first user chat window 130 message content field 120, namely, the depicted first user content 224.

Figure 3:
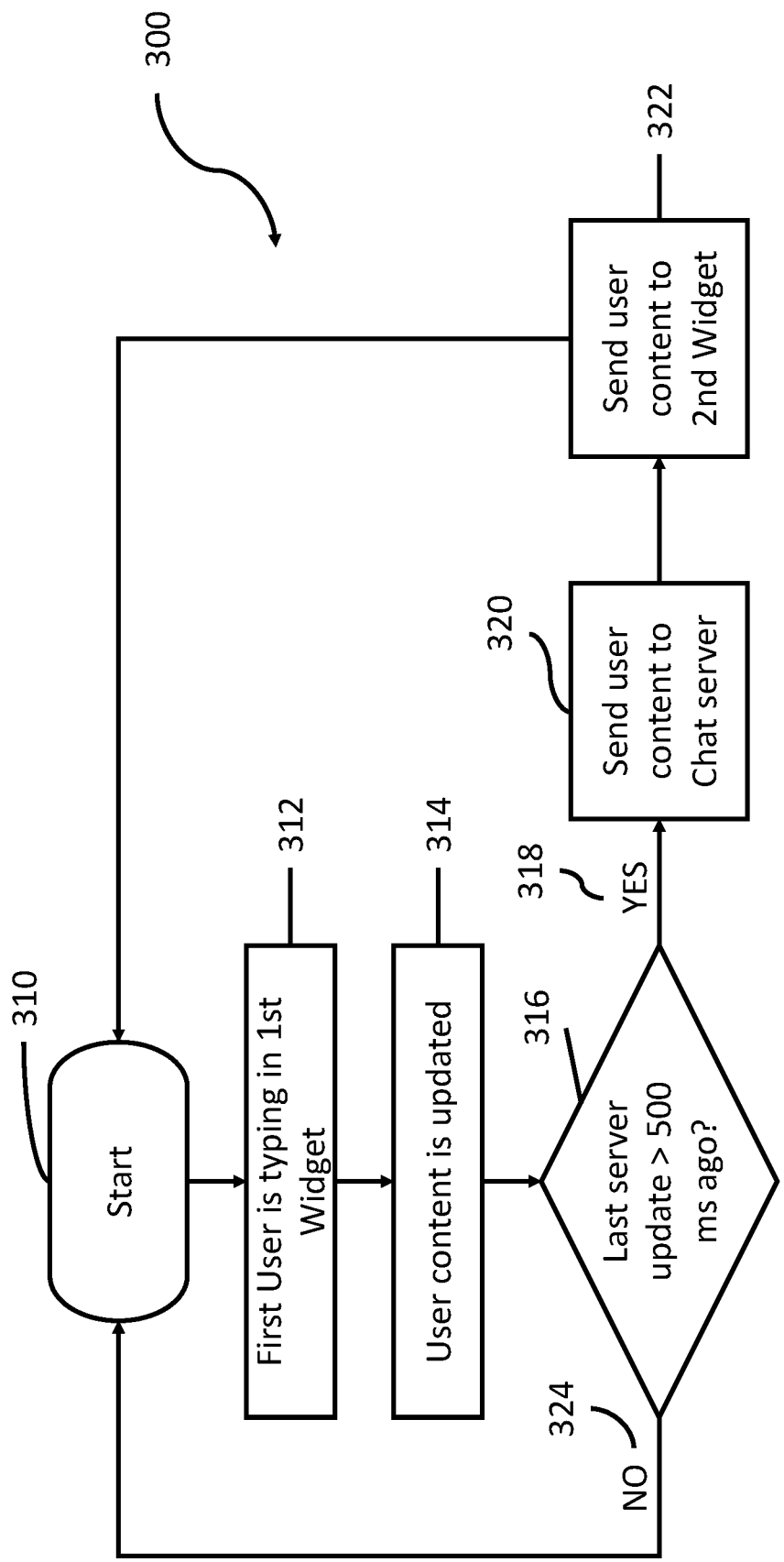
FIG. 3 depicts steps required to trigger the embodiment workflow with time update criterion and data display flow.

FIG. 3 depicts a flow chart of the aforementioned flow of communication with a number of references being made to earlier figures. As shown, the flow of communication starts 310 and then proceeds with the first user starting to type a message and/or otherwise introduce content 312 into a first widget message content field (see e.g., 120, FIG. 1). In a next step, 314, a current state of the typed message or first user content is updated (see e.g., 224, FIGS. 1 and 2) in the chat server (see e.g., 214, FIG. 2). A determination 316 is then made as to whether the chat server has been updated in the last up to 500 ms. If the chat server has been updated within this time frame (YES, 318), the user content is sent 320 to the chat server (see e.g., 212, 214 FIG. 2) and then onwards 322 to the second widget (see e.g., 216, 218 FIG. 2) for display to the second user (see e.g., 222, FIG. 2). Thereafter, as would be understood by the skilled person, the depicted flow of communication or method may return to start 310 or end (not depicted for clarity). Returning to determination 316, if the last server update was not more than 500 ms ago (NO, 324), as would be understood by the skilled person, the flow of communication or method would return to start 310.

Figure 4:
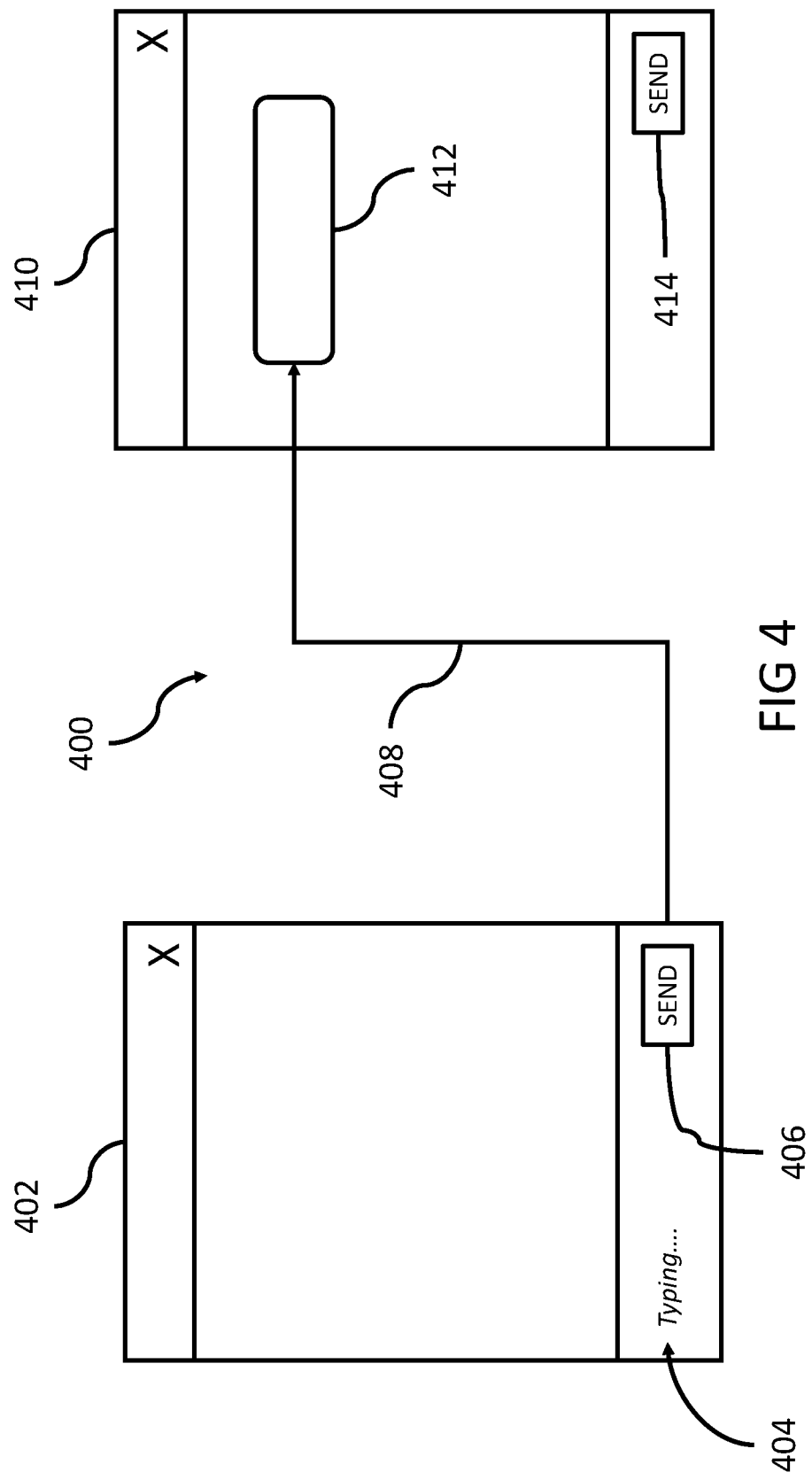
FIG. 4 depicts a relation between the first user chat window and the second user or agent chat window.

FIG. 4 presents the real-time processing flow 400 which shall allow displaying the manually unsent message or user content from the first user chat window or first widget 402 in and/or to the second user or agent chat window 410. As depicted, the first user chat window 402 includes a message content field 404 wherein user content, such as a Typing . . . (404) message, appears in real time. Other examples of typed messages appearing in real time may be found in FIGS. 1 and 2, namely, "Hello, I wa" (224). As depicted, the user chat window includes a send button 406 for manually sending a typed message or other entered content; the button being activated, as known to the skilled person, by for example an appropriate mouse click. As depicted, connector 408 illustrates the automatic sending of whatever is currently present in the message content field 404 so as to appear in a text field 412 appropriately configured and arranged to be visible to an agent (see e.g., 222). As depicted, the agent window includes a button for manually sending messages 414 by means known to the skilled person.

Further to embodiments of the present disclosure, such early message display shall not only serve as support for the agent or second user to understand the needs of the first user or customer but shall also speed up the process of response as the agent or second user is able to prepare it (i.e., the response) during the typing process being conducted by the first user (e.g., potential customer). The embodiment may be used in different types of live chat solutions based upon real-time message display. The embodiment may also find its applicability for different types of communication channels allowing to display messages instantly after being sent. Consequently, the invention described above constitutes an in-application implementable method which may fit-in to different solutions concerning communication.

The figures are merely schematic representations and serve only to explain the invention. Elements that are identical or have the same effect are consistently marked with the same reference signs.

What is claimed:

1. A system for real-time draft message previewing operating in between at least a first user operating the first widget and a second user operating a second widget, the system comprising:

the first widget configured to enable first user content comprising letter and number characters imputable by the first user;

a server configured to receive the first user content in a network request from the first widget and transfer the first user content to the second widget;

wherein the second widget comprises a preview field configured to preview the first user content to the second user;

wherein the first widget is further configured to send the network request to the server every up to 500 milliseconds; and wherein the server is further configured to transmit the network request to the second widget at or after at least every 500 milliseconds; wherein the second widget is further configured to display in real-time alphanumeric data inputted by the first user;

the second widget is configured to receive the network request and display the first user content in real-time; and the second widget is configured to display the status of typing when the first widget is actively used by the first user.

2. The system according to claim 1, wherein: the first widget is further configured to communicate with the server over a network connection in real-time;

the first widget is further arranged on a first user processor and configured to send the network request to the server; and the first widget is further configured to send updates to the server about new content typed in by the first user within 500 milliseconds.

3. The system according to claim 1, wherein: the server, the first widget, and the second widget are arranged in a network and configured to communicate with one another over the network.

4. A method for real-time draft message previewing operating in between at least a first user operating a first widget and a second user operating a second widget, the method comprising the steps of:

configuring the first widget to enable first user content comprising letter and number characters imputable by the first user; configuring a server to receive the first user content in a network request from the first widget and transferring data to the second widget, the data comprising at least the first user content;

displaying the data on the second widget configured on the processor of the second user;

updating the content displayed with a time interval of not more than 500 milliseconds;

wherein the second widget comprises a preview field configured to preview the first user content to the second user;

wherein the first widget is further configured to send the network request to the server every up to 500 milliseconds; and wherein the server is further configured to transmit the network request to the second widget at or after at least every 500 milliseconds;

wherein the second widget is further configured to display in real-time alphanumeric data inputted by the first user;

the second widget is configured to receive the network request and display the first user content in real-time; and the second widget is configured to display the status of typing when the first widget is actively used by the first user.

5. The method according to claim 4, wherein the network request comprises the first user content generated within 500 milliseconds.

6. The method according to claim 5, wherein the first user content comprises a grammatically incomplete message.

7. The method according to claim 6, wherein the first user content comprises alphanumeric text forming at least one of complete and incomplete words.

8. The method according to claim 7, further comprising the steps of: generating the first user content at the first widget; receiving the first user content at the second widget; and wherein the network requests are automatically generated at the first widget.

9. The method according to claim 8, further comprising the steps of displaying the first user content at the second widget.

10. The method according to claim 9, wherein the first user content appears at the second widget in substantially real-time as the first user content is being generated at the first widget.

11. The method according to claim 10, wherein: the server is a chat server; the first user content is directed to at least one of customer service and technical support; and at least one of the first widgets and the second widget comprise at least one of communication window and a preview field.

12. The method according to claim 11, wherein the first user content is communicated via a communication channel.

13. The system according to claim 2, wherein: the first widget is further configured to stop sending updates when the first user ends or withdraws typing; and the first widget is further configured to initiate sending updates about message preview as soon as the first user starts an unsent message.

14. The system according to claim 3, wherein: the second widget is further configured to stop displaying the content types when a message is sent or withdrawn; and the second widget is further configured to resume display in real-time the alphanumeric data entered by the first user once the user types in new content.

* * * * *